(12) United States Patent
Combs

(10) Patent No.: US 10,246,315 B2
(45) Date of Patent: Apr. 2, 2019

(54) IMPROVEMENTS TO HAND TRUCK AND KIT THEREOF

(71) Applicant: Jerry Combs, Eaton, OH (US)

(72) Inventor: Jerry Combs, Eaton, OH (US)

( * ) Notice: Subject to any disclaimer, the term of this patent is extended or adjusted under 35 U.S.C. 154(b) by 0 days.

(21) Appl. No.: 15/744,929

(22) PCT Filed: Mar. 15, 2017

(86) PCT No.: PCT/US2017/022405
§ 371 (c)(1),
(2) Date: Jan. 15, 2018

(87) PCT Pub. No.: WO2017/165163
PCT Pub. Date: Sep. 28, 2017

(65) Prior Publication Data
US 2019/0010035 A1    Jan. 10, 2019

Related U.S. Application Data

(60) Provisional application No. 62/313,248, filed on Mar. 25, 2016.

(51) Int. Cl.
| | | |
|---|---|---|
| *B66F 9/075* | (2006.01) | |
| *B66F 9/00* | (2006.01) | |
| *B66F 9/06* | (2006.01) | |
| *B62B 1/12* | (2006.01) | |

(52) U.S. Cl.
CPC .............. *B66F 9/075* (2013.01); *B62B 1/12* (2013.01); *B66F 9/00* (2013.01); *B66F 9/06* (2013.01); *B62B 2203/13* (2013.01); *B62B 2206/06* (2013.01)

(58) Field of Classification Search
CPC ... B60B 351/09; B60B 2310/305; B25H 1/04; B62B 2204/24; B62B 1/12; B62B 1/125; B62B 3/02; B62B 2204/406; B62B 1/10; B62B 1/264; B62B 1/262; B62B 1/14; B62B 1/18; B62B 1/22
See application file for complete search history.

(56) References Cited

U.S. PATENT DOCUMENTS

| | | | |
|---|---|---|---|
| 3,876,039 A | 4/1975 | Bushnell, Jr. | |
| 4,421,209 A | 12/1983 | Vermette et al. | |
| 4,421,709 A * | 12/1983 | Steinberg | B29C 41/24 264/216 |

(Continued)

FOREIGN PATENT DOCUMENTS

| | | |
|---|---|---|
| EP | 2845835 | 3/2015 |
| GB | 2353770 | 3/2001 |

OTHER PUBLICATIONS

International Search Report and Written Opinion for PCT/US2017/022405 dated Jun. 9, 2017.

*Primary Examiner* — James A Shriver, II
*Assistant Examiner* — James J Triggs
(74) *Attorney, Agent, or Firm* — Thomas E. Lees, LLC

(57) ABSTRACT

A hand truck that weighs less than twenty-three kilograms (23 kg) when unloaded. The hand truck has a platform with wheels, which permits the platform to travel along a beam while reducing the chances of seizing as objects are loaded on or unloaded from the hand truck. The hand truck also has a strut pulley sub-assembly that controls the rate of travel of the platform along the beam.

19 Claims, 8 Drawing Sheets

(56) References Cited

U.S. PATENT DOCUMENTS

| | | | |
|---|---|---|---|
| 6,398,477 B1* | 6/2002 | Fox | B66F 9/06 |
| | | | 414/490 |
| 6,457,727 B1* | 10/2002 | Tolly | B62B 1/14 |
| | | | 280/47.19 |
| 2005/0169540 A1* | 8/2005 | Funakubo | G06T 9/005 |
| | | | 382/232 |
| 2005/0191159 A1 | 9/2005 | Benko | |
| 2006/0070816 A1 | 4/2006 | Schroder | |
| 2006/0169540 A1 | 8/2006 | Tygard | |
| 2007/0080024 A1 | 4/2007 | Langenkamp et al. | |

* cited by examiner

IMPROVEMENTS TO HAND TRUCK AND KIT THEREOF

CROSS REFERENCE TO RELATED APPLICATIONS

This application claims the benefit of U.S. Provisional Patent Application Ser. No. 62/313,248, filed on 2016 Mar. 25, by Combs et al., and having the title "Improvements to Hand Truck and Kit Thereof," which is incorporated by reference in its entirety as if expressly set forth herein.

This application also incorporates by reference in its entirety U.S. Pat. No. 6,457,727, issued to Tolly in 2002 Oct. 1 and having the title "Hand Truck and Kit Thereof."

BACKGROUND

Field of the Disclosure

The present disclosure relates generally to equipment and, more particularly, to hand trucks.

Description of Related Art

Hand trucks and other hand-operated material moving devices have been widely used for years. For example, U.S. Pat. No. 6,457,727, issued to Tolly in 2002 Oct. 1 and having the title "Hand Truck and Kit Thereof" (hereafter, "Tolly Patent" or "Tolly Dolly"), shows a spring-loaded hand truck. Because of the ubiquity of such devices, there are ongoing efforts to improve these hand trucks.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

SUMMARY

Figure 1:
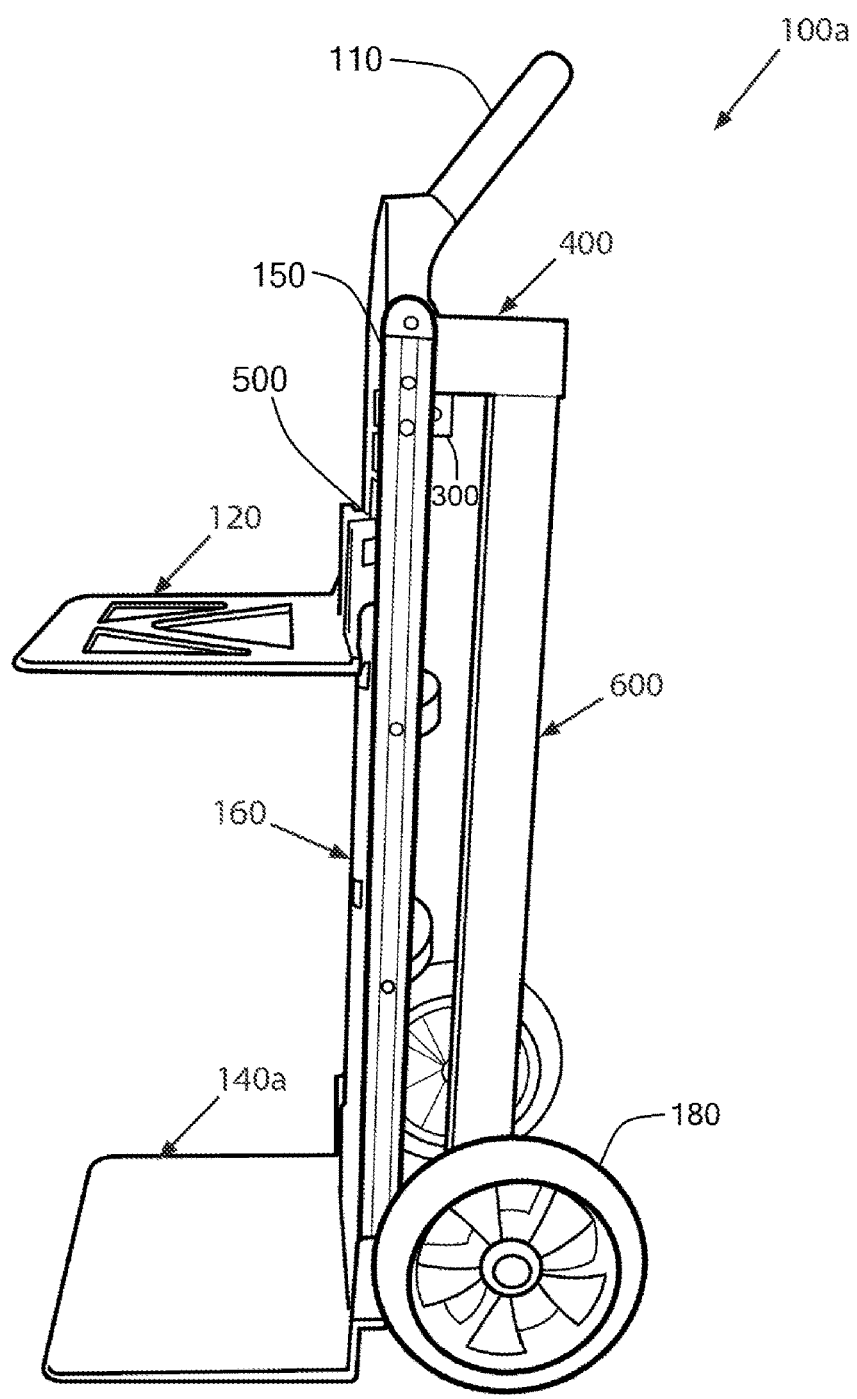
FIG. 1 is a drawing showing an assembled view of one embodiment of an improved hand truck.

The present disclosure teaches improvements to hand trucks.

Briefly described, one embodiment comprises a hand truck that weighs less than twenty-three kilograms (23 kg) when unloaded. The hand truck has a platform with rollers (or wheels or casters). The rollers permit the platform to travel along a beam with minimal seizing as objects are loaded on or unloaded from the hand truck. The hand truck also has a strut pulley sub-assembly that controls the rate of travel of the platform.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

DETAILED DESCRIPTION OF THE EMBODIMENTS

By way of introduction, the prior art Tolly Patent teaches a hand truck that has a spring-loaded platform, which permits the platform to move downward when weight is added to the platform and move upward as weight is removed from the platform. Thus, for example, when an operator loads boxes onto the spring-loaded platform, the platform lowers as a function of the added weight. Conversely, as the operator removes boxes, the platform elevates in response to the reduced weight. As one can appreciate, any lifting motion by the operator is assisted by the spring, thereby alleviating some of the effort expended by the operator in lifting objects from the platform. The Tolly Patent also teaches a hydraulic dampener that dampens (or retards) the spring-loaded movement of the platform, thereby reducing the possibility of injuries from unexpected releases of the spring.

There are, however, several problems with the Tolly Dolly, which are not readily apparent from the Tolly Patent. First, the movement of the platform is guided by a shaft on which the platform slides upward and downward. Unfortunately, frictional forces and alignment issues sometimes result in malfunctions due to seizing (or binding). Second, mounting the kit in the Tolly Patent to a conventional hand truck results in a total weight that exceeds approximately seventy-five (75) pounds (lbs), or over thirty-four (34) kilograms (kg), thereby making the completed assembly heavy and unwieldy. Third, the Tolly Patent teaches only connections of different components by "welding, bracketing, screwing or bolting" which results in a laborious manufacturing process that is not susceptible to mass production.

Improved hand trucks, as discussed below, overcome some (if not all) of these drawbacks.

Specifically, by providing improved hand trucks that are manufactured using carefully-selected materials, the weight of the improved hand trucks is less than 23 kg (or less than 50 lbs). In addition, by using extruded pieces (instead welded, bracketed, screwed, or bolted pieces) for several sub-assemblies, the improved hand trucks provide greater strength and longevity, while also permitting more efficient mass production of these improved hand trucks. Furthermore, for some embodiments, additional components are added to the improved hand truck to reduce friction, improve safety, balance weight, or better control how the weight travels upward and downward on the hand truck.

With all of this said, those having skill in the art will appreciate that it is not a trivial task to obtain a less-than-23 kg hand truck when adding additional components because, by its very nature, the installation of these additional components increases (rather than decreases) the total weight of the hand truck. Consequently, the embodiments shown below are not simply an aggregation of readily-available materials or the result of routine experimental design choices. To the contrary, each embodiment shown herein, as a whole, provides a technical solution that produces a technical effect in a technical field.

Specifically, some embodiments of the disclosed hand truck provide the technical solution of rollers (or casters or wheels) on a platform body sub-assembly. The technical solution of a rolling platform results in the technical effect of reducing or eliminating seizing (or binding) of the platform. All of this is done within the technical field of spring-loaded hand trucks. Significantly, because additional components are installed, obtaining a lighter hand truck (less than 23 kg) despite the addition of these technical components represents a notable progress and a prominent substantive feature for the disclosed hand trucks.

Those having skill in the art will further appreciate that the platform body sub-assembly in this disclosure is not an obvious variant over the Tolly Patent because the principles of operation are remarkably different between a sliding platform (as in Tolly) and a rolling platform (as disclosed herein), because it would be impossible for the sliding platform to resolve the problem of seizing (or binding).

Having described broadly some embodiments that ameliorate several of the drawbacks of the Tolly Dolly, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Figure 2:
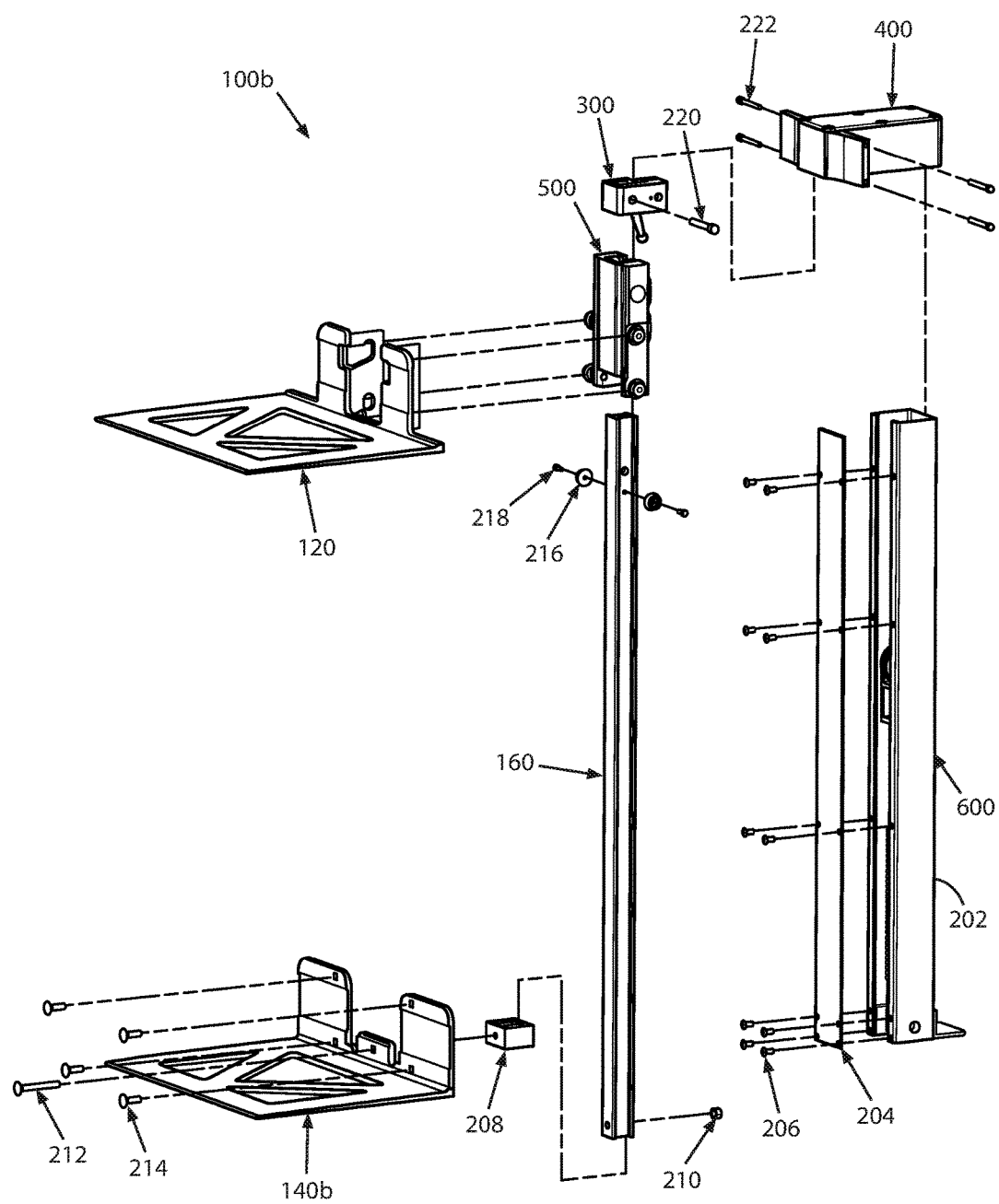
FIG. 2 is a drawing showing an exploded view of one embodiment of an improved hand truck.

FIG. 1 is a drawing showing an assembled view of an embodiment of an improved hand truck 100a and FIG. 2 is a drawing showing an exploded view of an embodiment of an improved hand truck 100b. When fully assembled, the hand truck 100a, 100b has a total unloaded weight of less than twenty-three kilograms (23 kg). In other words, without any loads, the total weight of the hand truck 100a, 100b is less than 23 kg.

As shown in FIGS. 1 and 2, the hand truck 100a, 100b comprises a frame 150, a handle 110 located at the top of the frame 150, and wheels 180 located at the lower portion of the frame 150. The wheels 180 impart mobility to the hand truck 100a, 100b. The hand truck 100a, 100b further comprises a beam 160 (shown here as an H-beam 160) that is located substantially along the frame 150. The beam 160 extends downward from its top (denoted herein as H-beam top, approximately where the handle 110 resides) to its bottom (denoted herein as H-beam bottom, approximately where the wheels 180 reside). Preferably, the H-beam 160 is approximately eighty-four centimeters (84 cm).

The hand truck 100a, 100b further comprises a bottom toe plate 140a, 140b located at the bottom of the frame 150 approximately where the wheels 180 are mounted. As shown in FIG. 2, the bottom toe plate 140b is affixed to the H-beam bottom by an H-beam bracket 208, using a long bolt 212 and a nut 210. For stability, the bottom toe plate 140b is also affixed to the frame 150 using four (4) short bolts 214, namely, two (2) short bolts 214 on the left side of the frame 150 and two (2) short bolts 214 on the right side of the frame 150.

The hand truck 100a, 100b further comprises a platform body sub-assembly 500 that travels downward and upward along a portion of the H-beam 160. The H-beam bracket 208 at the H-beam bottom limits the downward travel of the platform body sub-assembly 500. A top toe plate assembly 120, which is affixed to the platform body sub-assembly 500, extends substantially perpendicular to the H-beam 160. Because the top toe plate assembly 120 is affixed to the platform body sub-assembly 500, the top toe plate assembly 120 travels concurrently with the platform body sub-assembly 500 as items are loaded to and unloaded from the top toe plate assembly 120. In order to reduce the total unloaded weight of the hand truck 100a, 100b, the top toe plate assembly 120 is manufactured using a lightweight material, such as, for example, Aluminum Common Grade 6061 with T6 tempering (commonly abbreviated as "Aluminum 6061-T6"). As shown in FIG. 2, once the platform body sub-assembly 500 is installed on the H-beam 160, a pair of bumpers 216 and screws 218 limit the upward travel of the platform body sub-assembly 500 along the H-beam 160. It should be appreciated that, for some embodiments, the beam 160 can be any type of center pole. Alternatively, it should be appreciated that the beam 160, in other embodiments, can be one side of the frame itself. Consequently, beam 160 is defined herein as any substantially straight structure on which the platform body sub-assembly 500 can travel.

The hand truck 100a, 100b further comprises a brake-body sub-assembly 300, which is mechanically affixed to the H-beam 160 with a screw 220. The brake-body sub-assembly 300, when activated or engaged, applies friction to a cable (not shown in FIG. 2) and ultimately restricts movement of the platform body sub-assembly 500.

The hand truck 100a, 100b further comprises a strut pulley sub-assembly 600, which is arranged substantially parallel to the H-beam 160, and a head sub-assembly 400, which connects the H-beam top to the upper end of the strut pulley sub-assembly 600. The strut pulley sub-assembly 600 houses a strut (described below with reference to FIGS. 6A and 6B) and one or more springs (also described below with reference to FIGS. 6A and 6B). The combination of the strut and the spring affects how quickly or slowly the platform body sub-assembly 500 travels along the H-beam 160.

The strut pulley sub-assembly 600 comprises a cover 202 and a front cover plate 204, which is affixed to the cover 202 by several button screws 206. In the embodiment of FIG. 2, ten (10) button screws 206 are shown, but those having skill in the art will understand that different types of screws (and for that matter, different fastening mechanisms) can be used. Also, fewer screws (or more screws) can be used to affix the front cover plate 204 to the cover 202, depending on how securely the front cover plate 204 needs to be secured to the cover 202.

The head sub-assembly 400 is mounted to the frame 150 using four (4) cap screws 222, namely, two (2) cap screws 222 on the right of the head sub-assembly 400 and two (2) cap screws 222 on the left of the head sub-assembly 400. The head sub-assembly 400 houses pulleys and bearings (described below with reference to FIGS. 4A and 4B), which allow the platform body sub-assembly 500 to be connected to a strut and springs by a rope (also described in greater detail with reference to FIGS. 6A and 6B). For convenience, the term rope is defined expressly herein to encompass a rope, a cable, a wire, a belt, a string, a chain, or any other item that can be used in a pulley system and any equivalents thereof.

It should be appreciated that the H-beam 160, many of the components within the brake-body sub-assembly 300, many of the components within the head sub-assembly 400, many of the components within the platform body sub-assembly 500, and many of the components within the strut pulley sub-assembly 600 are also manufactured using lightweight materials, such as, for example, Aluminum 6005-T5. Because adding these components increases the total unloaded weight of the hand truck 100a, 100b, the dimensions, tolerances, and preferred materials are all factors that need to be considered in manufacturing the hand truck 100a, 100b so that the total unloaded weight does not exceed 23 kg. Thus, unlike the Tolly Patent (which taught welding, bracketing, screwing, and bolting of components), the components described below are largely manufactured by extruding the component, thereby further reducing the total unloaded weight. It should be appreciated that other procedures may be employed in lieu of or in addition to extruding.

Having described several embodiments of the hand truck 100a, 100b, attention is now turned to FIGS. 3, 4A, 4B, 5, 6A, and 6B, which show several embodiments of the sub-assemblies that are installed on the hand truck 100a, 100b of FIGS. 1 and 2. For the sake of clarity, the drawings are described by: (a) setting forth the components shown in the drawings; (b) showing the interaction of the components; and (c) describing the function of the components. To the extent that the drawings clearly illustrate how the components interact and function, only a truncated explanation is provided.

Figure 3:
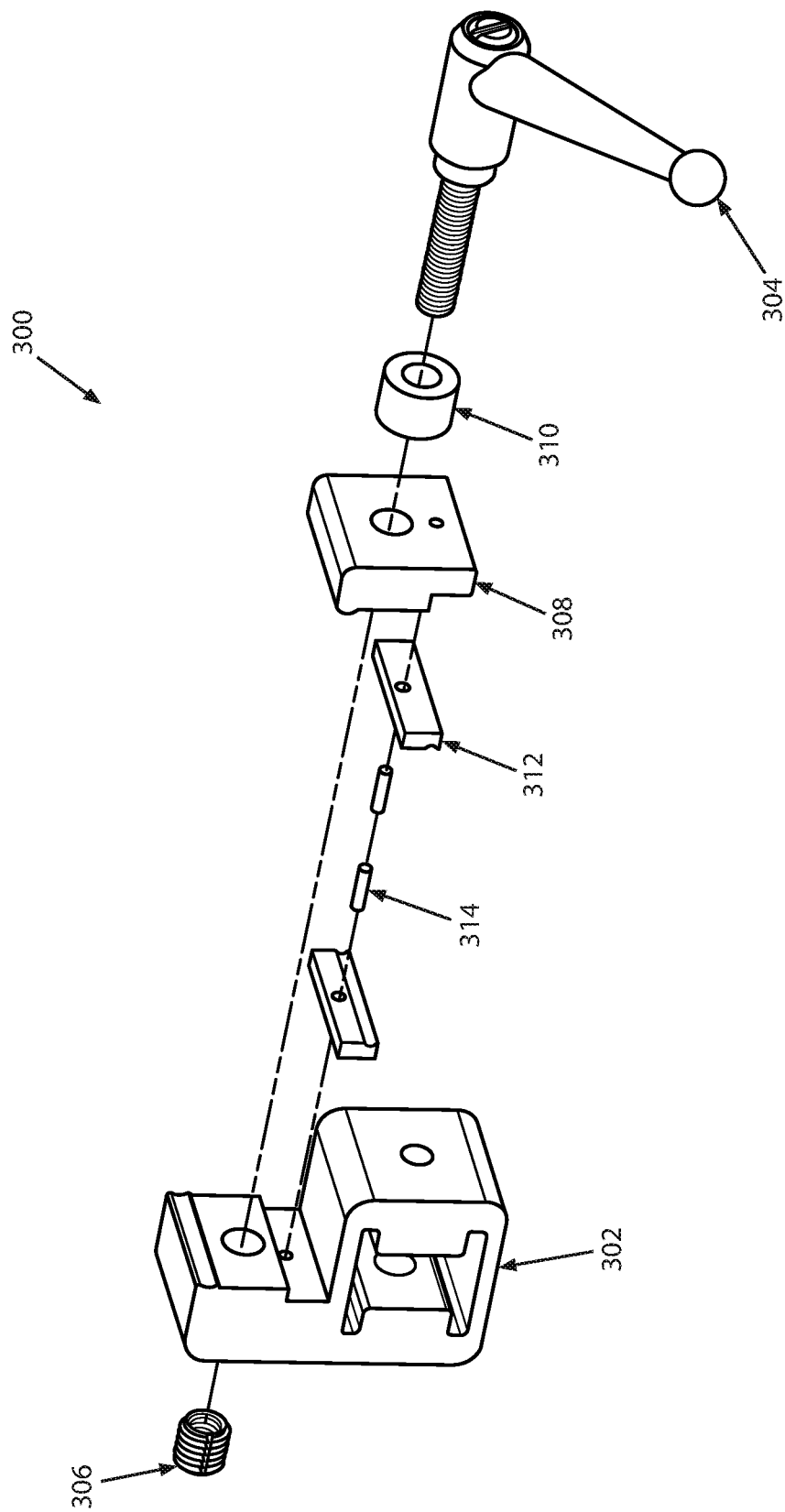
FIG. 3 is a drawing showing an exploded view of one embodiment of a brake-body sub-assembly.

FIG. 3 is a drawing showing an exploded view of one embodiment of a brake-body sub-assembly 300, which provides a mechanism for braking or applying friction to a cable (not shown in FIG. 3). In the specific embodiment of FIG. 3, the brake-body sub-assembly 300 comprises, on one end, a brake body 302 with a locking king cert 306 and, on the other end, a brake handle 304 with a brake-handle spacer 310. The brake handle 304 has a threaded component that mates with threads in the locking king cert 306, which is positioned within a hole in the brake body 302. In between the brake body 302 and the brake-handle spacer 310 reside several components that function cooperatively to apply friction or a braking mechanism to the cable (not shown in FIG. 3). These components include two (2) internal brakes 312, two (2) dowel pins 314, and a brake clamp 308. In operation, when an operator turns the brake handle 304, the brake clamp 308 moves toward the cable (not shown in FIG. 3). The movement of the brake clamp 308 results in a corresponding pressure applied between the two (2) internal brakes 312. As the pressure increases, each of the internal brakes 312 move closer together and, consequently, increases friction between the internal brakes 312 and any component that resides between the internal brakes 312 (such as, for example, a cable). As one can appreciate, providing such a brake-body sub-assembly 300 improves safety by permitting an operator to lock the top toe plate assembly 120 in place while loading or unloading.

Figure 4A:
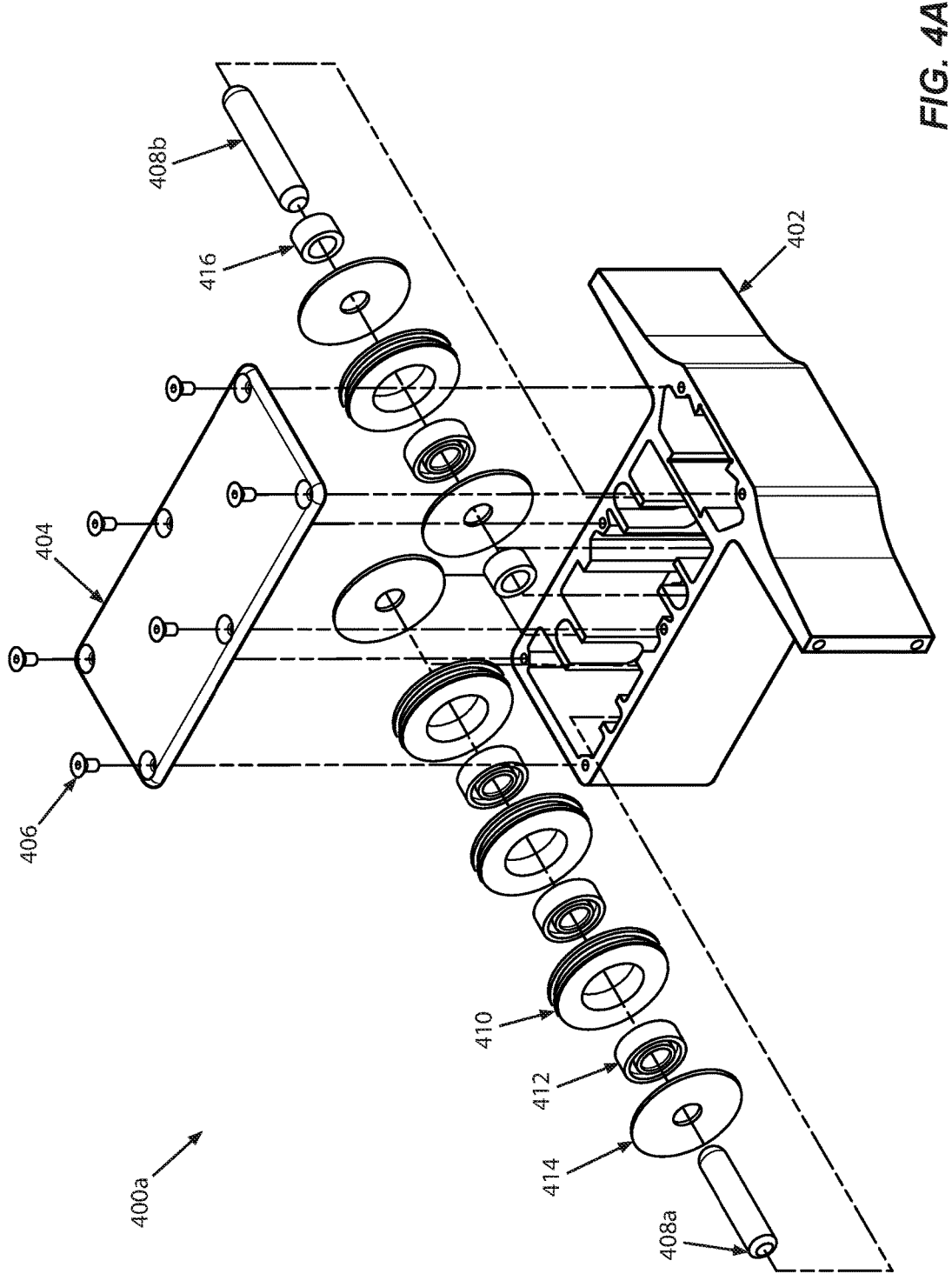
FIG. 4A is a diagram showing an exploded view of one embodiment of a head sub-assembly.
Figure 4B:
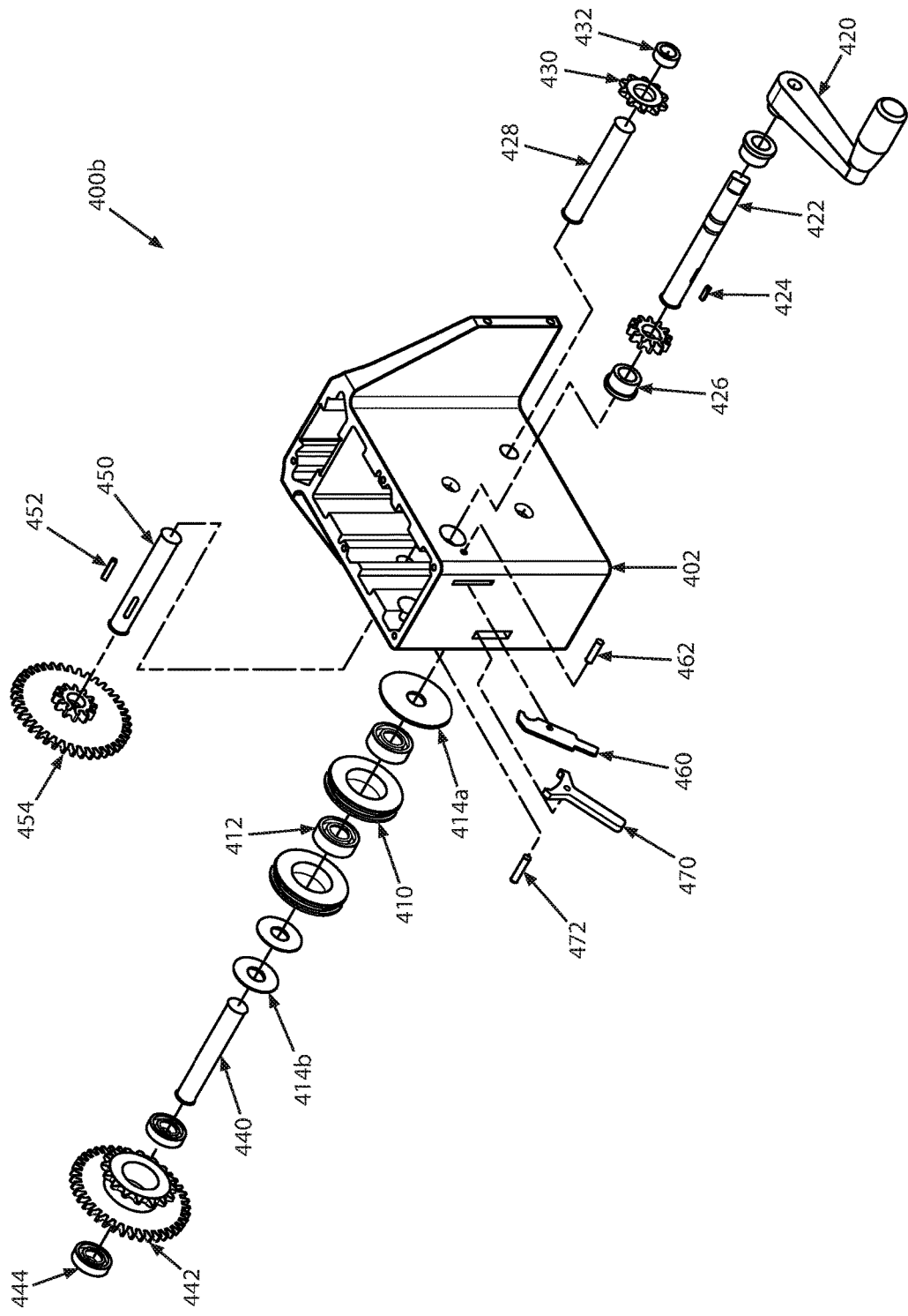
FIG. 4B is a diagram showing an exploded view of another embodiment of a head sub-assembly.

Continuing, FIGS. 4A and 4B are diagrams showing an exploded view of two different embodiments of a head sub-assembly 400a, 400b. As noted above, the head sub-assembly 400 connects the H-beam 160 to the strut pulley sub-assembly 600. Additionally, the head sub-assembly 400 houses the mechanism to operatively couple, through a cable, the strut and springs in the strut pulley sub-assembly 600 to the platform body sub-assembly 500.

The first embodiment of the head sub-assembly 400a (FIG. 4A) comprises a head 402, a head cover plate 404, six (6) flat-head screws 406, two (2) head axles 408a, 408b (collectively, 408), four (4) pulleys 410, four (4) inner bearings 412, four (4) washers 414, and two (2) head spacers 416. As described with reference to FIGS. 1 and 2, the head sub-assembly 400 operatively couples, through a cable, the strut and springs in the strut pulley sub-assembly 600 to the platform body sub-assembly 500.

Consequently, one half of the head axles 408, pulleys 410, inner bearings 412, washers 414, and head spacers 416 is located internal to the head sub-assembly 400a near or above where the platform body sub-assembly 500 connects to the head sub-assembly 400. As such, this first half of the components is responsible for redirecting pulley forces applied to or from the platform body sub-assembly 500.

The other half of the head axles 408, pulleys 410, inner bearings 412, washers 414, and head spacers 416 is located internal to the head sub-assembly 400a near or above where the strut pulley sub-assembly 600 connects to the head sub-assembly 400. As such, this second half of the components is responsible for redirecting pulley forces applied to or from the strut pulley sub-assembly 600. The rope (or wire, or cable, etc.) sits in the grooves of the pulleys 410.

In order to properly redirect pulley forces, the pulleys 410 and inner bearings 412 are alternatingly mounted onto their respective head axles 408 and placed into the head 402. Thereafter, the head cover plate 404 is secured to the head 402 using flat head screws 406, thereby protecting the internal pulley mechanism from outside elements such as dust, etc. The head cover plate 404 also functions to maintain the rope within the grooves of the pulley.

Turning now to FIG. 4B, unlike the first embodiment of the head sub-assembly 400a (FIG. 4A), the second embodiment of the head sub-assembly 400b (FIG. 4B) allows a user to incrementally raise or lower the platform body sub-assembly 500 using a crank that is connected to one or more sprockets or gears. Additionally, the embodiment of FIG. 4B provides a locking mechanism, thereby obviating the need for a separate braking mechanism (such as that shown in FIG. 3). Consequently, the head sub-assembly 400b of FIG. 4B is more complicated. The more-complicated head sub-assembly 400b comprises a head 402, two (2) pulleys 410, two (2) inner bearings 412, a large washer 414a, two (2) small washers 414b, a crank handle 420, a crank shaft 422, a lower key 424, two (2) flange bushings 426, a lower pulley shaft 428, a lower sprocket 430, an outer bearing 432, a lower train shaft 440, a gear sprocket combination 442 (shown with large radius gear and small radius sprocket), two (2) bearings 444, an upper train shaft 450, an upper key 452, a combination gear 454 (shown with large radius sprocket and small radius gear), a shaft position lock 460, a small lever pin 462, a gear ratchet lock 470, and a large lever pin 472. It should be appreciated that set screws can be used in lieu of the lower key 424.

The combination gear 454 is mounted on the upper train shaft 450, thereby allowing the combination gear 454 to rotate about the upper train shaft 450. The bearings 444, gear sprocket combination 442, washers 414, pulleys 410, and inner bearings 412 are mounted together onto the lower train shaft 440. The teeth from the combination gear 454 engage with the teeth in the gear sprocket combination 442. Thus, in operation, each revolution of the gear sprocket combination 442 results in a corresponding revolution of the pulleys 410. Depending on the gear ratio between the gear sprocket combination 442 and the combination gear 454, the gear sprocket combination 442 imparts a proportionate angle of rotation in the combination gear 454 (or vice versa).

The lower sprocket 430 is mounted on the lower pulley shaft 428 so as to rotate about the lower pulley shaft 428. The teeth of the lower sprocket 430 engage with the teeth of the combination gear 454. Thus, when an operator turns the crank handle 420, the combination gear 454 and the gear sprocket combination 442 turn in proportion to their respective gear ratios. In other words, an operator can control the rotation of the pulleys 410 with the crank handle 420. For preferable embodiments, the axial position of the crank shaft 422 can be moved (slightly into or slightly out of the head 402) such that the rotation of the crank handle 420 can be isolated from the rotation of the gears, thereby preventing uncontrolled turning of the crank handle 420.

The shaft position lock 460 mounts pivotally to the head 402 using the small lever pin 462. The shaft position lock 460 secures the crank shaft 422 in a fixed axial position (either slightly in or slightly out of the head 402). When pivoted inwardly to engage the crank shaft 422, the shaft position lock 460 prevents the crank shaft 422 from moving axially inward or axially outward with reference to the head 402. The gear ratchet lock 470 mounts pivotally to the head 402 using the large lever pin 472. Thus, when pivoted inwardly to engage the gear sprocket combination 442, the gear ratchet lock 470 effectively locks the gear sprocket combination 442, thereby preventing it from rotating. As one can see from the exploded view of FIG. 4B, providing both a cranking mechanism (420, 422) and a locking mechanism (460, 470) allows an operator to have greater control over the hand truck 100a, 100b. Furthermore, consolidating the braking mechanism within the head sub-assembly 400 further reduces the total unloaded weight of the hand truck 100a, 100b.

Figure 5:
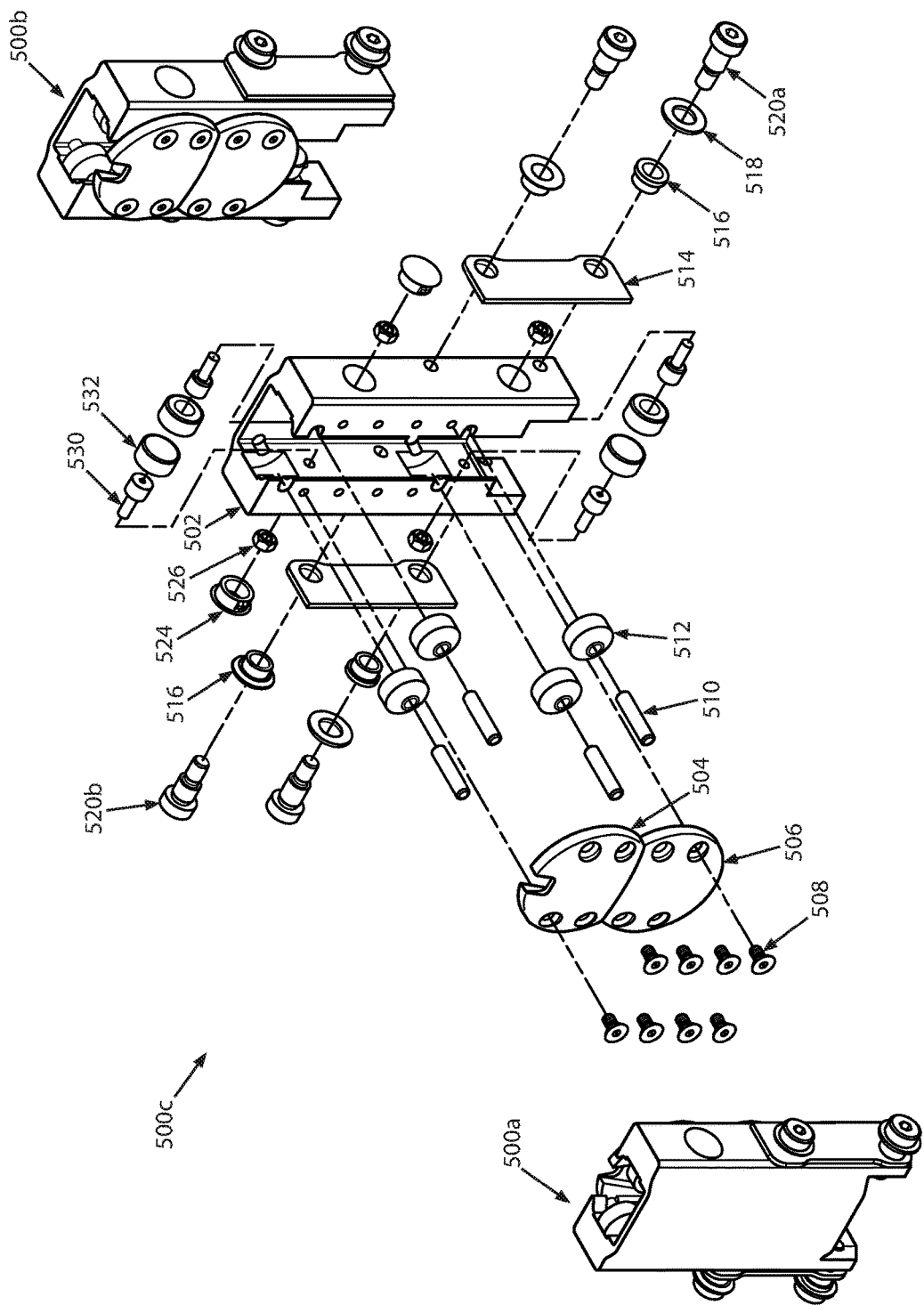
FIG. 5 is a diagram showing a front perspective view, a rear perspective view, and an exploded view of one embodiment of a platform body sub-assembly.

Having described several different embodiments of the head sub-assembly (FIGS. 4A and 4B) and several embodiments of braking mechanisms (FIGS. 3 and 4B), attention is now turned to FIG. 5, which shows one embodiment of a platform body sub-assembly 500. Specifically, FIG. 5 shows a front perspective view 500a, a rear perspective view 500b, and an exploded view 500c of the platform body sub-assembly 500.

As shown in FIG. 5, the platform body sub-assembly 500 comprises a platform body 502 with an inner cavity, within which the H-beam 160 resides. The platform body sub-assembly 500 further comprises an upper platform back 504, a lower platform back 506, and eight (8) flush screws 508 that attach the platform backs 504, 506 to the platform body 502.

The platform body sub-assembly 500 further comprises four (4) platform rollers 512 that are coupled internally to the platform body 502 (within the inner cavity) using four (4) lift block axles 510 (one axle 510 for each roller 512). Specifically, each roller 512 is located in one of the inner corners of the inner cavity of the platform body 502 so that the rollers 512 make direct contact with the web of the H-beam 160 during operation of the hand truck 100a, 100b. Preferably, the rollers 512 are manufactures using polynylon material (or other durable composite materials).

The platform body sub-assembly 500 further comprises four (4) cam followers 530 and their respective dust caps 532, which are attached internally to the platform body 502 by four (4) nuts 526 (one (1) for each cam follower 530). Each of the nuts 526 is covered by its respective plug 524. The cam followers 530 engage the inside of the flange of the H-beam 160. For some embodiments, the platform body sub-assembly 500 also comprises two (2) wear pads 514 (one for each side) to prevent wearing. The wear pads 514 are affixed to the platform body 502 using bushings 516, washers 518, and shoulder screws 520, 520a, 520b. Because the platform body 502 of FIG. 5 travels along the H-beam 160 via the rollers 512 and the cam followers 530, problems associated with binding or seizing are reduced, if not largely eliminated.

Figure 6A:
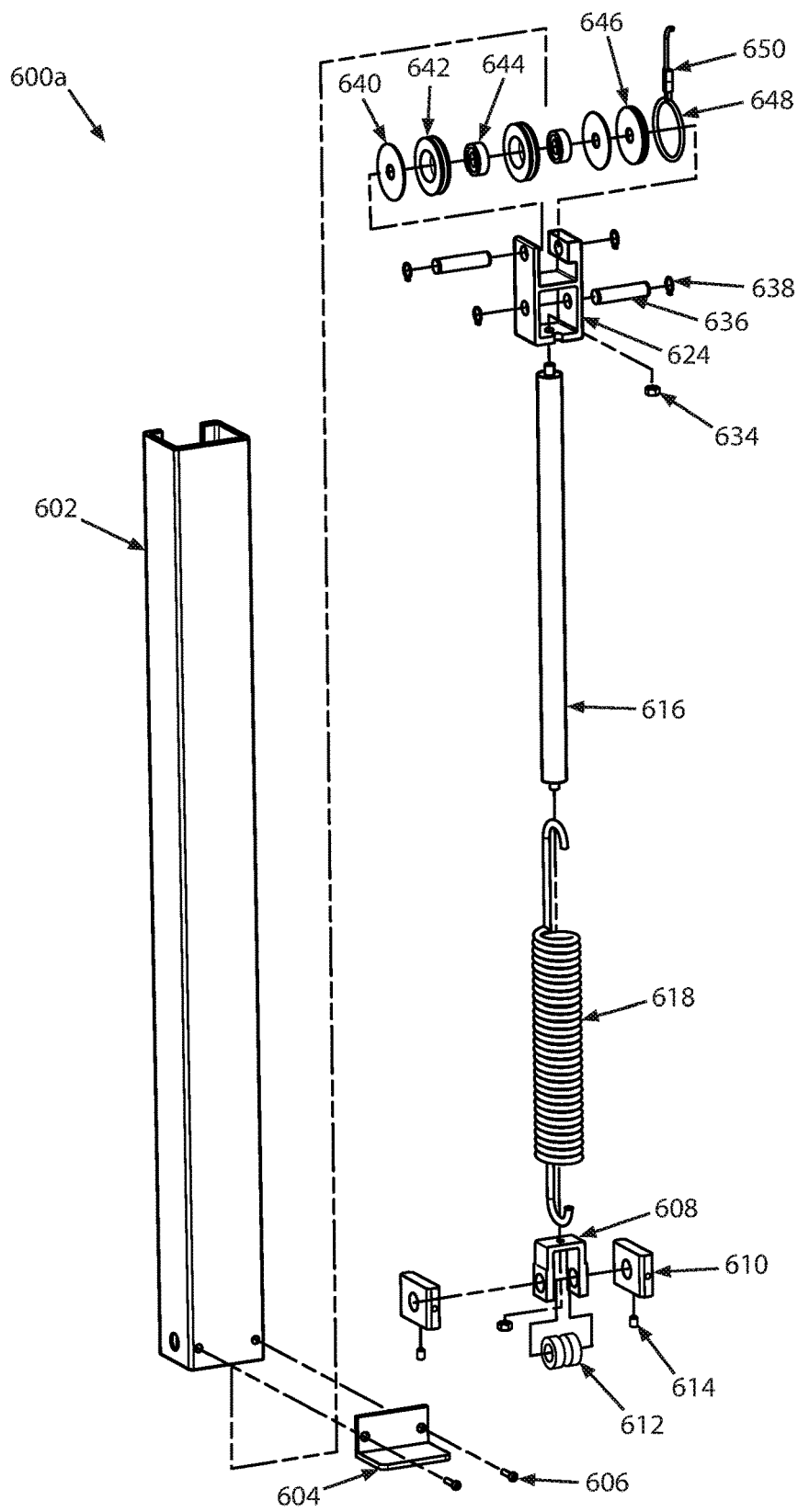
FIG. 6A is a diagram showing an exploded view of one embodiment of a strut pulley sub-assembly.
Figure 6B:
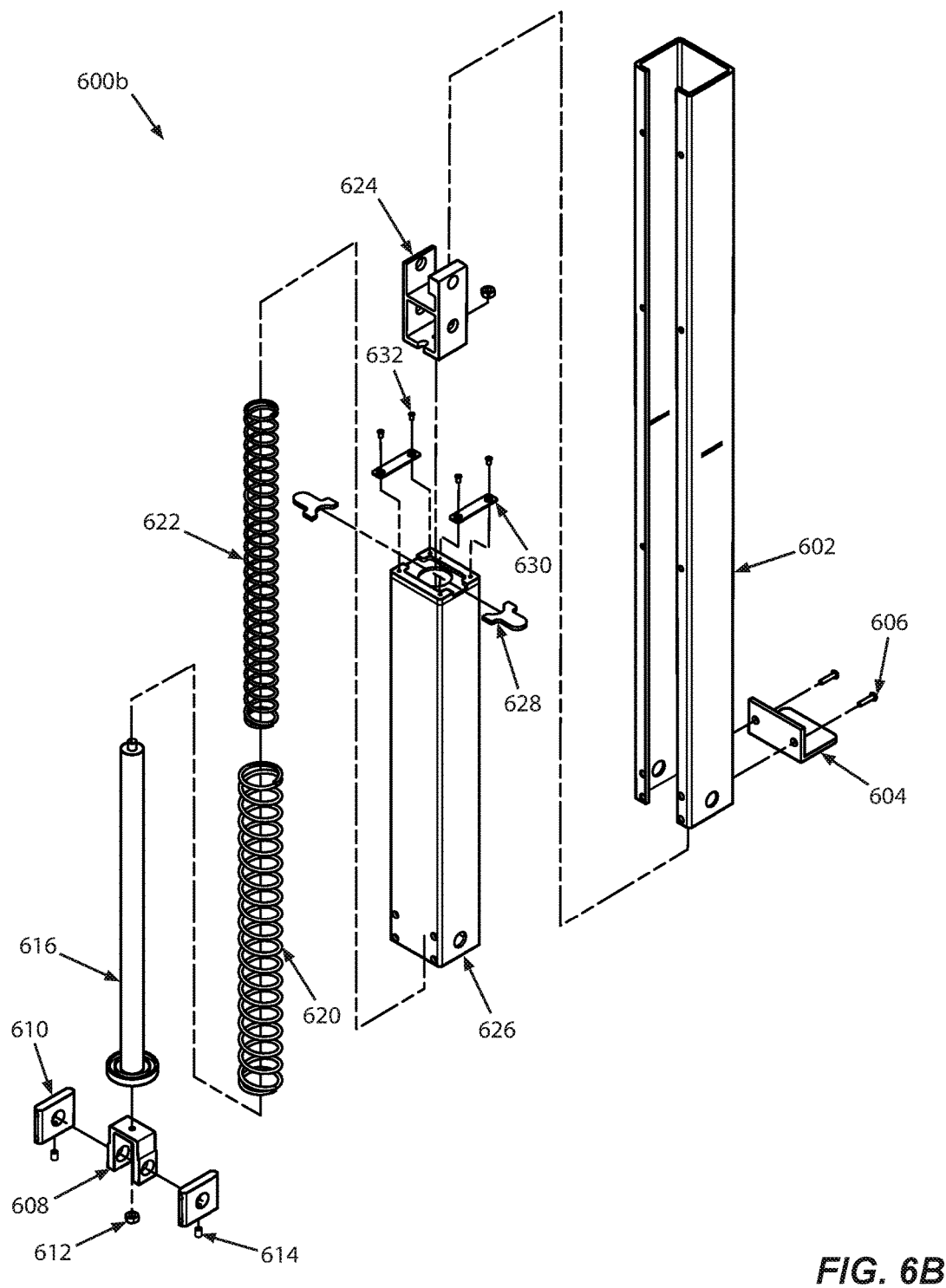
FIG. 6B is a diagram showing an exploded view of another embodiment of a strut pulley sub-assembly.

FIGS. 6A and 6B are diagrams showing exploded views of two (2) different embodiments of a strut pulley sub-assembly 600a, 600b. The strut pulley sub-assembly 600a, 600b permits greater control over how the platform body sub-assembly 500 travels along the H-beam 160.

In the first embodiment, the strut pulley sub-assembly 600a comprises a U-shaped cover 602, a toe kick 604, and two (2) button screws 606. The strut pulley sub-assembly 600a further comprises a dampener strut 616 and an extension spring 618 located in the cavity of the U-shaped cover 602. The strut pulley sub-assembly 600a further comprises a strut mount 608 with a spring retainer 612, which is affixed to the strut mount 608 using an axle of the hand truck (not shown in FIG. 6A). The axle (not shown in FIG. 6A) in turn secures to axle brackets 610 through the holes in the axle bracket 610. The axle brackets 610 are secured to the toe kick 604 through the cover 602 via the button screws 606.

The bottom of the dampener strut 616 is secured to the strut mount 608 using a nut 634, while the bottom of the extension spring 618 is formed into a hook that secures to the spring retainer 652. Because the spring retainer 652 is located on the strut mount 608, the bottom of the dampener strut 616 and the bottom of the extension spring 618 are secured in substantially the same location.

The upper end of the strut pulley sub-assembly 600b comprises a pulley mount 624 that accommodates two (2) axles. A bottom axle 636 is secured to the pulley mount 624 using two (2) retainer rings 638 (one (1) for each side). Similarly, an upper axle 636 is also secured to the pulley mount 624 using two (2) retainer rings 638. Pulleys 642, bearings 644, washers, and a cable retainer 646 are arranged on the upper axle 636. The upper axle 636 is then secured within the pulley mount 624 after a rope 648 is attached to the cable retainer 646 using, for example, a compression sleeve 650. Preferably, the rope is a 19×7 wire rope or another type of composite rope that resists wearing and fraying. The top of the dampener strut 616 is connected to the pulley mount 624 using a nut 634. The top of the extension spring 618 is also connected to the pulley mount 624. Consequently, the extension spring 618 extends and contracts coextensively with the dampener strut 616.

The rope 648 extends from the cable retainer 646 in the pulley mount 624, through the head sub-assembly 400a, 400b, and is eventually connected to the platform sub-assembly 500. Consequently, the dampener strut 616 dampens the movement of the platform sub-assembly 500, while the extension spring 618 provides a lifting mechanism to counteract the weight of any items that are placed on the top toe plate assembly 120.

FIG. 6B is a diagram showing an exploded view of another embodiment of a strut pulley sub-assembly 600b. Insofar as the cover 602, toe kick 604, button screws 606, strut mount 608, axle brackets 610, nuts 612, socket screws 614, dampener strut 616, and pulley mount 624 are described with reference to FIG. 6A, only a truncated discussion of these particular components is provided with reference to FIG. 6B.

Unlike FIG. 6A, the strut pulley sub-assembly 600b of FIG. 6B comprises two springs (an outer spring 620 and an inner spring 622) and a spring cover weldment 626. The strut pulley sub-assembly 600b further comprises two (2) push-pull tabs 628, two (2) spring cover tabs 630, and four (4) flat head screws 632. The push-pull tabs 628 are affixed to the spring cover weldment 626 by the spring cover tabs 630 and flat head screws 632.

The dampener strut 616 is arranged concentrically in the inner spring 622, and the inner spring 622 is arranged concentrically in the outer spring 620. This concentric arrangement 616, 620, 622 is placed in the spring cover weldment 626. The bottom of the springs 620, 622 and the bottom of the body of the dampener strut 616 are affixed together such that the bottom of the springs 620, 622 and the bottom of the body of the dampener strut 616 move coextensively in relation to the bottom of the strut pulley sub-assembly 600*b*.

Because an operator can slide the push-pull tabs 628 either toward each other or away from each other, it is possible to selectively engage or disengage the inner spring 622, thereby changing the effective spring constant within the entire system. Consequently, the strut pulley sub-assembly 600*b* also permits greater control over how much weight the hand truck 100*a*, 100*b* can accommodate.

Having described several different embodiments of the hand truck 100*a*, 100*b*, and having described several different embodiments of the components that are installed onto the hand truck 100*a*, 100*b*, numerous the technical differences between the disclosed embodiments and the Tolly Patent are worth noting.

First, the Tolly Patent teaches a platform guided by a shaft for its upward and downward movement. Unfortunately, frictional forces and alignment issues sometimes result in malfunctions, such as seizing or binding of the platform during unloading and loading. Unlike the Tolly Patent, the rollers (also designated as casters or wheels) on the platform body sub-assembly 500 largely eliminate the problem of binding or seizing.

Second, the Tolly Patent provides no guidance on the specific materials used to manufacture each of its components, thereby resulting in prior art hand trucks being manufactured with heavier materials and correspondingly resulting in less safe hand trucks (due to their excessive weight). Unlike the prior art hand trucks, this disclosure often specifies the precise materials from which the components are manufactured, going so far as to identify the grade of the extruded aluminum. The specificity extends to the pulley system (specifying a steel wire rope (more specifically, a 19×7 wire rope), the rollers (specifying a poly-nylon material), and so on. These selections are not routine trial-and-error, insofar as the selected material must meet the requirements for cost, strength, weight, and susceptibility to extrusion (or mass production). Thus, the selection of the material itself was a non-trivial process, which required consideration of multiple different factors.

Third, the Tolly Patent teaches only welding, bracketing, screwing, or bolting in the manufacture of the components. These processes necessarily require joinder of multiple components. Conversely, as understood from the drawings, the disclosed embodiments take advantage of an extrusion process to manufacture many of the components. Unlike welding, bracketing, screwing, or bolting, the extruded components as described herein allow for fabrication of a single component without joining together multiple components. This results in stronger components and, consequently, a stronger assembled hand truck.

Fourth, the particular design of the components in the disclosed embodiments, such as the head sub-assembly 400, permits smaller and stronger components with less material. Because many of these components are extruded, the configurations and dimensions of the components also needed to be evaluated to make sure that they could be manufactured by industrially-feasible extrusion processes.

Fifth, the Tolly Patent shows the upper end of the brake and the upper end of the spring connected to an arrestor pulley. Unfortunately, the direct connection to the arrestor pulley results in many windings of the spring being unusable because those windings are used to secure the spring to the arrestor pulley. Additionally, the configuration of the spring with the brake and the arrestor pulley results in greater susceptibility to failure. Unlike the Tolly Patent, the disclosed embodiments show the upper end of the spring being configured as a hook, thereby allowing full use of all of the windings of the spring.

Finally, it should be appreciated that the spring can be pre-stretched, thereby changing the spring behavior so that the spring constant is non-linear as a function of stretch.

In several other embodiments, a crank and locking mechanism are described so that the platform can be raised or lowered to a desired height and locked in place. By way of example, the lock (and releasing mechanism) can be operated with an operator's foot. None of these differences are either taught or suggested by the Tolly Patent.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. A hand truck comprising:
   (a) an H-beam having a length, the beam comprising:
      (a1) an H-beam top; and
      (a2) an H-beam bottom;
   (b) a platform body sub-assembly comprising platform rollers, the platform rollers engaging the H-beam to permit the platform body sub-assembly to travel along a portion of the length of the H-beam;
   (c) a plate affixed to the platform body sub-assembly to permit the plate to travel concurrently with the platform body sub-assembly, the plate being arranged substantially perpendicular to the H-beam;
   (d) a strut pulley sub-assembly arranged substantially parallel to the beam, the strut pulley sub-assembly comprising:
      (d1) an upper end;
      (d2) a lower end;
      (d3) a dampener strut comprising:
         (d1A) a strut top; and
         (d1B) a strut bottom;
      (d4) a spring arranged substantially parallel to the dampener strut, the spring comprising:
         (d4A) a spring top; and
         (d4B) a spring bottom;
      (d5) a strut mount mechanically connecting the strut bottom to the spring bottom; and
      (d6) a pulley mount mechanically connecting the strut top to the spring top;
   (e) a head sub-assembly connecting the upper end of the strut pulley sub-assembly to the beam top;
   (f) a rope extending from the platform body sub-assembly to the pulley mount through the head sub-assembly, the rope connecting the platform body sub-assembly to the pulley mount; and
   (g) a total unloaded weight of less than twenty-three kilograms (23 kg).

2. The hand truck of claim 1, further comprising:
   (h) a brake-body sub-assembly mechanically coupled to the head sub-assembly, the brake-body sub-assembly comprising:
      (h1) a brake handle; and
      (h2) internal brakes engaged by the brake handle, the internal brakes to apply friction to the rope and restrict movement of the platform body sub-assembly when engaged.

3. A hand truck comprising:
   a beam comprising a beam top and a beam bottom;

a platform body sub-assembly comprising rollers, the rollers engaging the beam to permit the platform body sub-assembly to travel along a portion of the beam;

a strut pulley sub-assembly arranged substantially parallel to the beam, the strut pulley sub-assembly comprising:
an upper end;
a lower end;
a strut comprising a strut top and a strut bottom; and
a spring arranged substantially parallel to the strut, the spring comprising a spring top mechanically coupled to the strut top, the spring further comprising a spring bottom mechanically coupled to the strut bottom, the spring further comprising coils;

a head sub-assembly connecting the beam top to an upper end of the strut pulley sub-assembly;

a rope connecting the platform body sub-assembly to the strut top; and a total weight of less than twenty-three kilograms (23 kg) when unloaded.

4. The hand truck of claim 3, wherein the spring top is indirectly coupled to the strut top by a pulley mount.

5. The hand truck of claim 3, further comprising means for braking the platform body sub-assembly.

6. The hand truck of claim 5, wherein the means for braking comprises:
a brake-body sub-assembly mechanically coupled to the head sub-assembly, the brake-body sub-assembly comprising:
a brake handle; and
internal brakes engaged by the brake handle, the internal brakes to apply friction to the rope when engaged, the internal brakes further to restrict movement of the platform body sub-assembly when engaged.

7. The hand truck of claim 5, wherein the means for braking comprises a locking mechanism integrated into the head sub-assembly.

8. The hand truck of claim 3, wherein the beam is an H-beam with a web and a flange.

9. The hand truck of claim 8, wherein the platform body sub-assembly further comprises:
a platform body having an inner cavity, the inner cavity to movably couple to the H-beam, the inner cavity comprising the rollers, the rollers to roll along a portion of the web of the H-beam; and
cam followers located in the inner cavity, the cam followers to roll along a portion of the flange of the H-beam.

10. The hand truck of claim 9, wherein the platform body comprises extruded aluminum.

11. The hand truck of claim 3, the strut pulley sub-assembly further comprising:
a strut mount directly connecting the strut bottom to the spring bottom;
a pulley mount directly connecting the strut top to the spring top; and
a pulley secured to the pulley mount, the pulley operatively coupled to the rope.

12. The hand truck of claim 11, wherein the spring is an inner spring and the strut is located within the coils of the inner spring, the strut pulley sub-assembly further comprising:
a spring cover weldment having an interior space; and
an outer spring arranged substantially parallel to the strut, the outer spring comprising coils, the coils of the outer spring and the coils of the inner spring being arranged concentrically, the strut and the inner spring and the outer spring being located in the interior space of spring cover weldment.

13. The hand truck of claim 11, the strut pulley sub-assembly further comprising extruded aluminum.

14. The hand truck of claim 3, wherein the head sub-assembly comprises:
a head mechanically attached to the upper end of the strut pulley sub-assembly, the head further being mechanically attached to the beam top;
a first pulley axle located within the head, the first pulley axle further being located above the upper end of the strut pulley sub-assembly;
a second pulley axle located within the head, the second pulley axle further being located above the beam top;
a first pulley rotationally mounted on the first axle; and
a second pulley rotationally mounted on the second axle, the first pulley coupled with the second pulley to cooperatively redirect forces between the beam and the strut pulley assembly.

15. The hand truck of claim 14, wherein the head comprises extruded aluminum.

16. The hand truck of claim 14, the head sub-assembly further comprising:
a first gear located within the head;
a second gear located within the head, the second gear being rotationally coupled to the first gear, the second gear to rotate in response to a rotation of the first gear; and
a crank handle located outside of the head, the crank handle mechanically coupled to the first gear, the crank handle to rotate the first gear when the crank handle is turned.

17. The hand truck of claim 16, the head sub-assembly further comprising a gear ratchet lock mounted pivotally on the head, the gear ratchet lock to prevent rotation of the first pulley.

18. The hand truck of claim 3, wherein the rope is at least one selected from the group consisting of:
a wire rope;
a cable;
a wire;
a belt;
a string;
a chain.

19. The hand truck of claim 3, wherein the rollers comprise poly-nylon material.

* * * * *

UNITED STATES PATENT AND TRADEMARK OFFICE
CERTIFICATE OF CORRECTION

PATENT NO. : 10,246,315 B2
APPLICATION NO. : 15/744929
DATED : April 2, 2019
INVENTOR(S) : Jerry Combs Page 1 of 1

It is certified that error appears in the above-identified patent and that said Letters Patent is hereby corrected as shown below:

In the Claims

Column 12, Claim 18, Line 54, "a string;" should read --a string; and--.

Signed and Sealed this
Fourth Day of June, 2019

Andrei Iancu
*Director of the United States Patent and Trademark Office*